(12) United States Patent
Tollimägi

(10) Patent No.: US 12,296,449 B2
(45) Date of Patent: May 13, 2025

(54) NET REPAIR PATCH LATCHING UNIT AND A SYSTEM FOR A NET PATCHING

(71) Applicant: VETE HOLDINGS OÜ, Tallinn (EE)

(72) Inventor: Timmu Tollimägi, Harju maakond (EE)

(73) Assignee: VETE HOLDINGS OÜ, Tallinn (EE)

( * ) Notice: Subject to any disclaimer, the term of this patent is extended or adjusted under 35 U.S.C. 154(b) by 312 days.

(21) Appl. No.: 17/946,557

(22) Filed: Sep. 16, 2022

(65) Prior Publication Data
US 2023/0085801 A1   Mar. 23, 2023

(30) Foreign Application Priority Data

Sep. 17, 2021 (EP) .................................... 21197349

(51) Int. Cl.
| | |
|---|---|
| B25B 33/00 | (2006.01) |
| A01G 13/32 | (2025.01) |
| A01K 75/00 | (2006.01) |
| E06B 9/52 | (2006.01) |
| F16G 11/10 | (2006.01) |
| F16G 11/14 | (2006.01) |

(52) U.S. Cl.
CPC ............. *B25B 33/00* (2013.01); *A01G 13/32* (2025.01); *A01K 75/005* (2022.02); *E06B 2009/525* (2013.01); *F16G 11/10* (2013.01); *F16G 11/14* (2013.01)

(58) Field of Classification Search
CPC . B25B 27/146; B25B 33/00; E06B 2009/525; F16B 45/023; F16B 45/024; F16B 45/02; F16G 11/10–103; F16G 11/14–146
See application file for complete search history.

(56) References Cited

U.S. PATENT DOCUMENTS

2015/0231815 A1*   8/2015   Shoham .............. B65D 1/0261
                                                           264/537

FOREIGN PATENT DOCUMENTS

| EP | 3122178 A1 | 11/2017 | |
|---|---|---|---|
| WO | WO-2015147650 A1 * | 10/2015 | ........... A01K 61/007 |

OTHER PUBLICATIONS

Deep Trekker Inc. "Net Patch Tool Demonstration | Aquaculture | DTG3 ROV" https://www.youtube.com/watch?v=KxYvqQppVZo, Published Feb. 21, 2020, 2 pages.
European Patent Office, Extended European Search Report, Application No. 21197349.0, mailed Mar. 15, 2022, 7 pages.

* cited by examiner

*Primary Examiner* — Tyrone V Hall, Jr.
(74) *Attorney, Agent, or Firm* — Ziegler IP Law Group, LLC.

(57) ABSTRACT

A net repair patch latching unit comprising one or more carabiners. The carabiner of the net repair patch latching unit comprises at least one load-bearing section; a spine and a forepart; one or more first grooves configured to accommodate a yarn of the net to be repaired; at least one elongated bendable part having a distal end and a proximal end. The elongated bendable part comprises at least one transitional bending area connecting the spine and the proximal end of the at least one bendable part; one or more guiding nudges protruding from the load-bearing section; one or more attaching element protruding from the load-bearing section.

16 Claims, 11 Drawing Sheets

NET REPAIR PATCH LATCHING UNIT AND A SYSTEM FOR A NET PATCHING

TECHNICAL FIELD

The present disclosure relates generally to a net repair patch latching unit and a system for repairing torn nets.

BACKGROUND

The nets used to protect fish farms, trees and plants may be damaged for several reasons. The nets of the fish-farms get damaged by the salt and algae, fish gnawing, human errors and from harsh weather conditions like storms. Fish farm nets get damaged over the course of its lifecycle. When unattended then the damages accumulate and this results in fish escaping. The nets for protecting trees and plants may be damaged because of the weather conditions, by birds and animals, by harvesting machinery. Therefore, tears and holes with different sizes appear in the nets. The size of the tears gets quickly bigger, if not fixed fast. The tears lead to critical failure of the nets and fish escaping from the fish farms or the birds and animals get access to the fruits, vegetables or berries. Thus, the damaged nets need to be fixed quickly.

The torn parts in the net can be fixed by different techniques, either manually or by a robot. Fixing the torn net manually may be complicated, depending on the type of the net. Whether it is an underwater fish net to protect fishes escaping from the fish-farms or a net used in heights to protect trees and plants from the birds and animals, a team of workers may be needed to fix the torn net. Especially complicated is fixing underwater nets where due to the safety regulations in many countries, at least a team of 4 divers is needed to stitch the torn areas in the net. As it is dangerous for humans to dive and fix the nets or to climb up to the heights a robot or drone operated net fixing solutions may be used.

However, these solutions are too slow, clumsy and cause additional potential failure points to the nets, the known techniques involve net patching and net sewing solutions. E.g., a known robot or drone patching solution relies on using springs that latch the patch onto the net. This causes stress to a small number of net yarns and contracts the net so folds appear at the sides where fish can escape. This patch is for emergency situations until divers or workers arrive on site to permanently fix the hole and cannot be used for extended periods. Another known robotic patching solution is wherein a plastic net is latched onto the net using plastic clips. However, the solution is not robust enough to withstand the required 18 months life cycle in fish farms. In addition, the rigidness of the patch changes the flexibility of the net. This causes increased wear on the edges of the patch that might compromise the integrity of the net.

The torn parts in the nets can be also fixed by a net sewing machine that can permanently fix holes with different shapes and sizes. The downside is the speed of the fixing. The robot or drone has to stay stable for a long period to perform the fixing. In addition, the tool is large and heavy meaning that a large robot is required to fix the hole. Due to the tool shape and size, it is complicated to fix the holes in cramped spaces like corners or areas where there are net tightening ropes. These are the locations where the holes appear most often.

Fixing the nets by using special tooling and robotics makes the fixing of the nets even more complicated. While attaching the patches to the torn net with the robot, a stress is created on the net. This makes the net move during assembling and holes on the sides of the patches are created. If a connector for fixing the nets has two or more parts it is complex and might break easily. Further, the known solutions of the means fastening the patch to the torn area of the damaged net are not sufficiently rigid, do not hold the patch in place and bend too much and thus may break easily.

Thus, in light of the foregoing discussion, to overcome the drawbacks, there is a need for a mechanism that would latch quickly onto the net without causing the yarn of the net any tearing, folding or add additional stress concentration points.

SUMMARY

An aim of the present disclosure is to provide a solution that overcomes the problems encountered in prior art. The aim of the present disclosure is achieved by a net repair patch latching unit and a system for a net patching. The embodiments according to the present disclosure enable to latch a net patch to the torn net so that the latching unit does not create any additional stress to the net to be repaired and thus does not cause any additional tearing of the net.

According to a first aspect of the present disclosure a net repair patch latching unit comprising one or more carabiners, wherein the one or more carabiners comprises at least one load-bearing section; a spine and a forepart; one or more first grooves configured to accommodate a yarn of the net to be repaired; at least one elongated bendable part having a distal end and a proximal end, wherein the at least one elongated bendable part comprises at least one transitional bending area connecting the spine and the proximal end of the at least one bendable part; one or more guiding nudges protruding from the load-bearing section; one or more attaching element protruding from the load-bearing section.

According to a second aspect of the present disclosure a system for a net patching comprising at least two net repair patch latching units according to the embodiments of the present disclosure; a net patch, wherein at least one net repair patch latching unit is attached to the net patch.

The embodiments according to the present disclosure are especially advantageous for the fish farms to reduce fish escapes from the farms. The net repair patch latching unit can be used with autonomous underwater robots or by divers operating in fish farms. The unit is useful for repairing the fish farm net pen nets and reducing fish from escaping.

The latching solution according to the present disclosure is purely mechanical and thus can be used with any kind of robot (e.g., autonomous robots, remotely operated vehicles, underwater robots, drones, etc.). The latching solution according to the present disclosure is operative one way only, which reduces the risk of de-latching. The latching mechanism has less parts than known latching mechanisms, thus reducing complexity, increasing reliability and easing manufacturing. The parts expected lifecycle at least 18 months because of the fish growing cycle, fish in open sea fish-farms are grown up to 18 months inside the nets. The latching unit doesn't contain any dissolving materials like salt as the latching unit might be held or stored underwater for extended periods before it is applied onto the net.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings.

Embodiments of the present disclosure will now be described, by way of example only, with references to the following diagrams, wherein:

FIG. 1B illustrates a net repair patch latching unit comprising two carabiners shown on FIG. 1a;

FIG. 1c illustrates a net repair patch latching unit comprising four carabiners shown on FIG. 1a;

FIG. 2b illustrates an assembled embodiment of the net repair patch latching unit shown on FIG. 2a;

DETAILED DESCRIPTION OF EMBODIMENTS

Figure 1A:
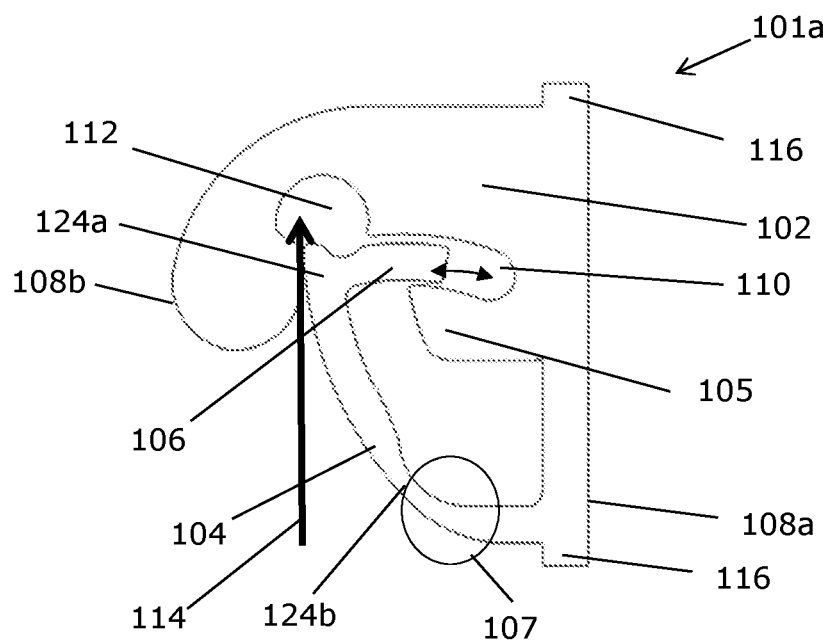
FIG. 1a illustrates a net repair patch latching unit comprising one carabiner according to an embodiment of the present disclosure.

The following detailed description illustrates embodiments of the present disclosure and ways in which they can be implemented.

According to a first aspect of the present disclosure a net repair patch latching unit comprising one or more carabiners, wherein the one or more carabiners comprises at least one load-bearing section; a spine and a forepart; one or more first grooves configured to accommodate a yarn of the net to be repaired; at least one elongated bendable part having a distal end and a proximal end, wherein the at least one elongated bendable part comprises at least one transitional bending area connecting the spine and the proximal end of the at least one bendable part; one or more guiding nudges protruding from the load-bearing section; one or more attaching element protruding from the load-bearing section. In example embodiments of the first aspect, the net repair patch latching unit comprising one or more carabiners, wherein the one or more carabiners comprises at least one load-bearing section, a spine and a forepart connected to the at least one load-bearing section; one or more first grooves arranged to the at least one load-bearing section, the one or more first grooves configured to accommodate a yarn of the net to be repaired; at least one elongated bendable part having a distal end and a proximal end and at least one transitional bending area, wherein the at least one elongated bendable part is connected with the at least one transitional bending area to the spine from the proximal end of the at least one bendable part; one or more guiding nudges protruding from the load-bearing section; one or more attaching element protruding from the load-bearing section.

The net to be patched can be a fish net, a plant protection net, a fence net, which has a teared area. The net to be patched may be located underwater, on the ground or above the ground (i.e., for protecting trees and fruits from the birds). The net repair patch latching unit can be applied onto the net without the mounting tool if applied by hand. The net repair patch latching unit enables to apply a net repair patch onto the hole or teared area in the net. The net repair patch latching unit is constructed using the as small number of parts as possible to reduce complexity of the components, improve reliability and ease manufacturing. The net repair patching unit can be attached to a robot, by means of a mounting tool, wherein the robot is configured to apply the patches by simply pushing the repair patch against the net. Depending on the type of the net, e.g., fish net or net for protecting plants, the robot may be an underwater robot or a drone. Alternatively, the net repair patch can be attached to the net manually.

The one or more carabiners may be single-piece. The one or more carabiners are configured to latch the net repair patch onto the net. The carabiner will latch onto the net only in one direction. Meaning that the net yarn can be inserted into the carabiner but cannot come out on its own. The carabiners work on a compliant mechanism principle meaning that the hole unit is a singular piece and there are no moving parts or moving joints. The carabiner lock moves by bending. In an embodiment the net repair patch latching unit comprises a carabiner as a singular unit, in other embodiments the net repair patch latching unit may comprise two or four carabiners. The one or more carabiners can be made of plastics, e.g., of marine grade plastics as it is highly valued flexible material, which is not too rigid. More specifically, the material may be e.g., High-density polyethylene (HDPE), polyoxymethylene (POM) or Fiber reinforced polymers (FRP). Other materials can be used by regulating the thickness of the transitional bending area. The net repair latching unit is located at the edges of the net repair patch with at least one carabiner per repair patch edge that fix onto the fish net. The repair patch can be extended indefinitely as each carabiner works individually. I.e., the singular carabiner or carabiner assemblies of up to 4 carabiners work independent of other carabiners and carabiner assemblies.

Alternatively, the latching part is fixed onto a rigid frame through bolting, tension force or equal solution. On the rigid frame the patch net is stretched to match the tightness of the repairable net. The net patch is meant to cover the part of the net where the hole or teared area is located. It is important to match the tightness of the patch to the net so that the net and patch holes align and the carabiners insert into the net with ease. The carabiner latches onto the net repair patch mechanically by bending. This allows the repair patch to be applied onto the net without a need for a reaction control by electric, hydraulic, pneumatics or similar systems. To provide more strength and flexibility to the carabiner the fibre reinforced plastics may be pre-tensed in the manufacturing process.

The load-bearing section is adapted to work as a bridge between the repair patch yarn and the net yarn. The load-bearing section has a first section and a second section opposite of the first section. The load-bearing section carries most of the load and the forces from the repair patch to the net and vice versa. Hence the thickness of the load-bearing section is at least 1 to 1 compared to the yarn of the net. This enables to reduce rotation of the carabiner and thus reduce the wear of the net.

The spine part of the carabiner forms a part of the carabiner that in respect from where the elongated bendable parts can bend. The spine is the base to where the bending parts are attached and in respect to what the bending is happening. The spine stays stiff when the bending is happening. The forepart provides additional stiffness to the load-bearing section. In an embodiment, the forepart moves regarding the bending of an elongated bendable part only when force is applied at the guiding nudge region. In the embodiments, wherein the net repair patch latching unit of two or four carabiners, the carabiners may be connected to each other by spine parts or by the foreparts. In different embodiments the carabiner may comprise e.g., one, two or four grooves for accommodating the repairable net yarn. The groove may be a space, slot or cavity where the yarn of the repair patch is pushed and locked.

At least one elongated bendable part bends when the force is applied from the upper section of the carabiner that pushes the elongated part against the net which by bending allows the yarn of the net to pass through to the groove configured to accommodate a yarn of the net. When the force is removed at least one elongated bendable part returns to its neutral (i.e., initial) position thus locking the yarn to one or more grooves. The elongated bendable part is adapted to work only in one direction, i.e., the yarn of the net can enter the groove but cannot escape from the groove due to the force impacting the elongated bendable part allowing the bendable part to return to its initial position. The carabiner may comprise additional areas such as slots, apertures, openings or walls to give additional flexibility to the structure. Without additional areas the carabiner elongated bendable parts might not bend enough or spring back to its original position to let the yarn into the groove. The additional areas may have different designs. In an embodiment, the bendable part is pushed inwards allowing the yarn the repair patch to enter the groove where it becomes locked. In another embodiment, at least one first groove is configured to be closed by the first elongated bendable part and the second elongated bendable part. The yarn of the repair patch is pushed through the centre and locked in the first groove. In another embodiment the first groove is located at the proximal end of the elongated bendable part and when the carabiner is being bent inwards the yarn of the net is enabled to slide to the first groove. These features provide the advantage that the carabiner is easy to produce by e.g., 3D printing or injection moulding. Optionally, in some embodiments, the carabiner may comprise further additional areas, e.g., a curved wall between the elongated bendable part and the spine part, which adds strength and flexibility to the elongated bendable part, thus allowing the elongated bendable part to be thinner and thus bend more without breaking while maintaining high strength. In some embodiments the carabiner may further comprise a magnet or solenoid system for closing the carabiner. E.g., when the carabiner is open and put in place, the position is visually confirmed (by camera) and then the magnetic system is activated to close the carabiner. The advantage of such embodiments is that the carabiners are reusable.

The at least one transitional bending area is a main bending point allowing the elongated bendable part to bend. The transitional bending area is the main area where the elongated bendable part of the carabiner is being bent allowing the yarn to slide onto its designated groove.

In an embodiment the nudge is configured to act as a guiding curve for the elongated bendable part to move and an anchoring point to keep the elongated bendable part in place and the carabiner locked and the net yarn in the designated groove when force is applied. In another embodiment the nudge keeps the net in the designated groove and prevents the yarn from sliding off the carabiner. The nudge prevents the yarn from sliding off the carabiner by directly blocking the yarns moving path or by blocking the bendable part from yielding to forces applied by the yarn. According to the embodiments the nudge provides additional vital structural rigidity to the carabiner.

The one or more attaching element can be a clamp or a nudge. In an embodiment, the one or more attaching element is protruded from the first section of the load-bearing section and is configured to hold the carabiner in a clip-on element of the mounting tool that is configured to apply the carabiner onto the net. In another embodiment, the nudge is protruded from the distal end of the elongated bendable part configured to keep the carabiner inside the mounting tool when only small forces are applied. This will give in and be released once the carabiner is latched onto the net. The attaching element is for attaching the carabiner to the mounting tool. The clip-on element when attached to the clip of the carabiner enables it to apply the carabiner on to the net. The clip stops the carabiner from detaching from the clip-on element until the carabiner is compressed enough that the net yarn has slid into its designed slot. The nudge prevents the yarn of the net from sliding off the carabiner. The nudge enables to hold the carabiner in the holding means according to the embodiments of the present disclosure and connect the carabiners to the mounting tool that applies the carabiner onto the net. It enables to stop the carabiner from detaching until it is compressed enough that the net yarn has slid into its designated slot. According to the embodiments of the present disclosure the holding means may be e.g., a repair patch holding means, a bracket, a clip-on element.

Optionally, the carabiner may further comprise a reinforcing rib between the elongated bendable part and the load-bearing section. The reinforcing rib is configured to provide additional strength and flexibility to the elongated bendable part allowing the elongated bendable part be made thinner and thus bend more without breaking while maintaining high strength.

In an embodiment, the net repair patch latching unit comprises two carabiners connected to each other by the spines by a net repair patch holding means or wherein the net repair patch latching unit comprises four carabiners connected to each other by the spines by the net repair patch holding means; wherein the distal end of elongated bendable part is extended to an L-shaped part, and wherein the load-bearing section comprises a socket between the at least one load-bearing structure section and the one or more guiding nudges. In one embodiment, wherein two carabiners are connected or in another embodiment, wherein four carabiners are connected, the repair patch holding means may be a bracket configured to connect the spine parts of the carabiners. The repair patch holding means is a component between the one or more carabiner it is attached to and the mounting tool. The repair patch holding means enable to attach the net repair patch latching unit to the mounting tool for more convenient net patching. In the embodiment, wherein the distal end of elongated bendable part is extended to an L-shaped part, and the load-bearing section comprises a socket between the at least one load-bearing structure section and the one or more guiding nudges, the socket is configured to accommodate the L-shaped part by applying force to the elongated bendable part towards the spine. The advantage of these embodiments is that it enables to repair nets having larger holes, i.e., the dimensions of the square, trapeze, or hexagon holes of the net is more than 30 mm×30 mm, thus being more suitable for larger net installations and the damages that are being repaired may be any size.

In the embodiment, wherein the net patch latching unit comprises a single carabiner, the distal end is supported against the inner side of the forepart so that between the distal end and the inner side of the forepart 108b is formed a path for the yarn of the net to be patched. On applying the net patch latching unit to the net to be patched, the yarn of the net exerts force to the distal end, the distal end bends from the transitional bending area, the L-shaped part moves to the socket and the path between the inner side of the forepart and the distal end opens for letting the yarn of the net to be patched to move to the first groove. When the yarn of the net to be patched is moved to the first groove the distal end moves back to its initial position against the inner side of the forepart 108b and locks the path and thus locking the yarn of the net to be patched to the first groove of the carabiner.

In the embodiment, wherein two carabiners are connected, the distal ends of both carabiners are supported against the inner sides of the foreparts of both carabiners so that between both distal ends and the inner sides of the foreparts are formed paths for the yarns of the net to be patched. On applying the net patch latching unit to the net to be patched, two yarns of the net exert force to the distal ends, the distal ends bend from the transitional bending areas, the L-shaped parts of both carabiners move to the respective sockets and the paths between the inner side of the foreparts and the distal ends open for letting the yarns of the net to be patched to move to the first grooves. When the yarns of the net to be patched are moved to the first grooves the distal ends move back to the initial positions against the inner sides of the foreparts and lock the paths and thus locking the yarns of the net to be patched to the first grooves of the carabiner.

In the embodiment, wherein four carabiners are connected the distal ends of each carabiner are supported against the inner sides of each forepart of each carabiner so that between each distal ends and the inner sides of the foreparts are formed paths for the yarns of the net to be patched. On applying the net patch latching unit to the net to be patched, four yarns of the net exert force to the distal ends, the distal ends bend from the transitional bending areas, the L-shaped parts of each carabiner move to the respective sockets and the paths between the inner side of the foreparts and the distal ends open for letting the yarns of the net to be patched to move to the first grooves. When the yarns of the net to be patched are moved to the first grooves the distal ends move back to the initial positions against the inner sides of the foreparts and lock the paths and thus locking the yarns of the net to be patched to the first grooves of the carabiner.

In an embodiment, the net repair patch latching unit comprises two load-bearing sections connected to each other by the foreparts; wherein the distal end of elongated bendable part is extended to an L-shaped part, and wherein the load-bearing section comprises a socket between the at least one load-bearing structure section and the one or more guiding nudges. In the embodiment, the foreparts can be connected rigidly so that the two connected load-bearing sections form a single piece unit. Alternatively, the foreparts can be connected by other means, e.g., by welding or gluing. The socket is configured to accommodate the L-shaped part on applying force to the elongated bendable part towards the spine. The advantage of such embodiments is that due to the fewer parts the carabiner is more durable and easier to produce by 3D printing and plastic injection molding. The more parts the more there is a chance for failure.

Such embodiments also fit better to the net to be patched, even when the net is on an angle compared to the carabiner because the risk that the thick junction part of the net might get in between the carabiner bending hinges and thus the carabiner will be unable to attach, is eliminated.

In this embodiment, when applying the net patch latching unit to the net to be patched, a yarn of the net exerts force to the distal ends, the distal ends bend from the transitional bending areas, the L-shaped parts of both carabiners move to the respective sockets and the path between the two distal ends open for letting the yarn of the net to be patched to move to the first groove. When the yarn of the net to be patched is moved to the first groove the distal ends move back to the initial positions against each other and lock the path and thus lock the yarn of the net to be patched to the first groove of the carabiner.

In an embodiment, the one or more carabiners comprises two elongated bendable parts, wherein the distal ends of the two elongated bendable parts are connected by the spine; or in another embodiment the one or more carabiners comprises four elongated bendable parts, wherein the distal ends of the four elongated bendable parts are connected by the spine. In an embodiment, the carabiner may be formed of two elongated bendable parts, which are joined together by the spine parts at the distal end and thereby forming the arched shaped structure. The embodiment having single arched shaped configuration is useful for the nets having the dimensions of the holes less than 15×15 mm. The advantage of the embodiment is that it requires less space for bending and does not stretch the net holes as much when installing. In another embodiment, wherein the carabiner comprises two arched shaped structures that are glued or welded together at the spine parts at the distal ends. In such embodiments, the carabiner may be uniformly made as a single piece. Either a one U-shaped or arched-shaped version or a double U-shaped or arched shaped version can be manufactured using a 3D printer (e.g., stereolithography 3D printer) or CNC milled from a solid block of plastic using a 5-axis CNC mill. Additionally, according to this embodiment, the carabiner is conical and symmetric in two axes. In addition, the single arch shaped structure or double arch shaped structure can be formed in single-piece by 3D printing or injection moulding. In some other embodiments the two arched shaped structures are oriented to each other according to the net hole shapes, such as hexagon or trapezoid. This embodiment enables to latch the carabiner onto the net repair patch and the net on two axes which reduces movement between the carabiner and the net, thus increasing reliability. According to the embodiment the carabiner has 4 points of contact with the net yarn when applied to the net to be fixed. This makes it more stable, because the carabiner moves less from side to side. This reduces the risk of the carabiner wearing through the net. Furthermore, the carabiner is pushed through only one net hole thus preventing the issues that appear when the repair patch is applied on an angle compared to the net. E.g., this enables to avoid the situation that the carabiner would attach to the wrong place on the net. Further, it also avoids the situation where more than one net yarns (or the knots or junctions of the net) get into the first grooves. This embodiment has also less parts compared to the other embodiments of the present disclosure, thus making the manufacturing and assembly easier and reducing the chance for failure. The advantage of the embodiment is that it has improved stability compared to the single arched shape embodiment as there are connection points with the net only in one axis (e.g., X-axis) and the carabiner could slide in the other axis (e.g., Y-axis).

On applying the net patch latching unit to the net to be patched, the spine is pushed through the net to be patched and the yarns of the net to be patched are pushed to the first grooves, wherein the guiding nudge are arranged to block the path so that the yarns don't slip out from the grooves.

According to the embodiments, the load-bearing section may further comprise at the outer edge one or more second grooves. The second groove is configured to accommodate a yarn of the net repair patch. The second groove is needed in such embodiments, wherein the net repair patch latching unit comprises two load-bearing sections connected to each other by the foreparts and the distal end of elongated bendable part is extended to an L-shaped part, wherein the load-bearing section comprises the socket between the at least one load-bearing structure section and the one or more guiding nudges.

In an embodiment, the distal end of elongated bendable part is formed to a S-shaped profile in side-view having a first curvature forming the first groove and a second curvature forming a second groove and wherein the load-bearing section is formed between the first groove and the second groove. In the embodiment, the S-shaped profile can be asymmetrical or symmetrical. The majority of forces are applied between the first groove and the second groove, i.e., between the net and the repair patch when the net repair patch latching unit is applied to the net to be fixed. When either is pushed or pulled then the area between the first groove and the second groove works towards keeping the repair patch and net as closely together as possible. The second groove is configured to accommodate a yarn of net patch. The repair patch and the net are connected through a solid connection. The elongated bendable part forms a part of the carabiner load-bearing section and additional support is not necessary as the net and the repair patch are located on the same structure (upper part of the elongated bendable part). Most forces therefore will be applied onto the load-bearing section. Depending on the required strength the load-bearing section can be made thicker to increase the overall durability. It is important to note that it is preferred to keep the net and the repair patch as close to each other as possible, because of the compound lever mechanism principle. The force on a point is multiplied the further the force is being applied which works on the same principle as a wrench. The longer the handle the easier it is to tighten and loosen a nut. The width of the carabiner is at least 1.5 times the thickness of the yarn. E.g., for 3 mm yarn, the thickness of the carabiner is at least 4.5 mm.

It is important to keep the repair patch and net as closely together as possible. The present embodiment enables to reduce the number of parts of the latching unit. The force difference must be as small as possible and hence the distance as small as possible. The thickness of the load-bearing section is at least 1 to 1 compared to the yarn of the net. So, when the net yarn is e.g., 3 mm in diameter then the load-bearing section is at least 3 mm in thickness in the thinnest part. This is because the materials used in the net and the carabiner are similar in strength. The carabiner is wider than the yarn giving it a reserve factor. The wider the carabiner the better the stability in terms of rotation, this means that the carabiner is less likely to rotate inside the net when it is installed thus reducing the wear on the net. The carabiner width to yarn thickness ratio is at least 1.5 to 1, e.g., 2.6(6) to 1. In addition, a minimum distance between the net yarn and the repair patch yarn is desired. This is due to the strength arm principle F=m*l (Force equals mass times length). When the distance between two points (the net and the patch) is doubled, then the effective force is also doubled. Thus, to strengthen the carabiner, thickness of the load-bearing section is increased according to the same ratio as the distance between the net and the repair patch.

In an embodiment, the net repair patch holding means is a bracket. The bracket is configured to fasten a yarn of the repair patch to the carabiner in the embodiment, wherein the latching part is fixed onto a rigid frame through bolting or equal solution. The net repair patch may comprise a rigid frame having net between the frame. A repair net that is meant to cover the part of the net where the hole is located is stretched onto the rigid frame. E.g., 25 cm×25 cm net repair patch would cover up to 80% of most common sized teared areas in the net. Optionally, the net repair patch holding means having a fastening adapter. In the embodiments, wherein multiple net repair patch latching units attached to the repair patch, the fastening adapter enables to fix multiple net repair patch latching units and the repair patch to the base frame.

In an embodiment, the repair patch latching unit comprises a clip-on element having one or more third grooves configured when clipped to the one or more carabiners to form a channel of the yarn of the repair patch. The clip-on element is configured to apply the carabiner onto the net. The clip-on element is configured to fasten a yarn of the repair patch to the one or more carabiners. The clip-on element is a component between the one or more carabiner it is attached to the mounting tool. The clip-on element according to this embodiment enables to install the carabiner onto the net. The clip-on element further enables to connect the carabiner to the mounting tool and connects the net patch to the carabiner. The clip-on element enables to attach the net repair patch latching unit to the mounting tool for more convenient net patching. Together with the one or more second grooves the one or more third grooves are configured to form a cavity for accommodating the yarn of the net repair patch when the clip-on element is placed to the carabiner.

In an embodiment, the repair patch holding means is formed of a clamp having a body and at least one pair of legs extended from the body, wherein each bendable leg comprises at it extending end socket of the one or more guiding nudges. The clamp when connected to the single or double arch shaped structure is configured to apply a force to each load-bearing section, thus pressing the proximal end of the elongated bendable part towards each one. The repair patch holding means is configured to hold the carabiner is smaller than the diameter of the carabiner causing the carabiner to bend. The bending of the carabiner forces the carabiner to push against the clamp thus fixing the carabiner firmly against the tool. The clamp contracting the carabiner also eases repair patch installation onto the net as the carabiners need less bending and therefore less force to be attached to the net. The Clamp 330 is solid and will not bend itself. The carabiner that is inserted into the clamp will bend and thus hold itself in the clamp. The clamp enables the carabiner to be applied onto the net pre-compressed. This means that the U-shaped carabiners are compressed (pushed inward) so that it would slide more easily into the net. The mounting tool sided clamp keeps the carabiners compressed and safely inside the clamp. When the carabiner is pushed through the net a little bit of additional compression happens, the carabiner goes through the net and the carabiner is released from the tool clamp.

In an embodiment, the one or more first grooves and second grooves may be coated with a grip coating selected from a group comprising high grip paint, a thin layer of rubber, a rubbery plastic. The high grip areas contact the repair patch and the net. The other outer surfaces will be hard and smooth and more slippery because the net yarn must slide on those surfaces and the less friction there is, the easier it is to install the patch.

The grip coating increases the frictional force between the carabiner and the net yarn, which provides additional stability to the carabiner (i.e., the net will slip and roll less) thus reducing the wear and tear on the net and the repair patch.

According to the embodiments, the net repair patch latching unit comprises a net repair patch. The net repair patch can be applied by using the net repair patch latching unit manually by a person or automatically by a robot or by a drone with using a net repair patch mounting tool for applying the net repair patch and carabiner of the net repair patch latching unit onto the net for covering the teared area with the net repair patch. The net repair patch may have the same or different net structure as the net that is being patched and the dimensions of the net repair patch cover at least the hole or teared area in the net when it is applied to the net.

In the embodiments of the net repair patch latching unit, wherein the one or more carabiners comprises two elongated bendable parts, wherein the distal ends of the two elongated bendable parts are connected by the spine; or wherein the one or more carabiners comprises four elongated bendable parts, wherein the distal ends of the four elongated bendable parts are connected by the spine, the one or more carabiners may further comprise at least one of the load-bearing section comprises a first part comprising the first groove and a second part comprising the attaching element and the second groove, wherein the first part is wider than the second part; the forepart comprises a locking nudge; an edge of one or more guiding nudges is elongated outwardly forming between the edge and an outer side of the load-bearing section a channel of the yarn of the repair patch; edges of the at least one elongated bendable part is rounded.

The load-bearing section comprises a first part comprising the first groove and a second part comprising the attaching element and the second groove, wherein the first part is wider than the second part. The wider part enables to achieve additional stability to the carabiners and thus to stabilize the whole net repair patch latching unit. The wider part does not allow the net repair patch latching unit to rotate in the net and has more contact area with the net. By less rotation it is meant less movement and less wear and tear. A narrowest part of the carabiner corresponds to a diameter of 2-4 yarn of the net and a widest part of the carabiner corresponds to a diameter of 3.5-6 yarn of the net. Parts of the net repair patch latching unit with different thicknesses are thus more stable and have several additional advantages. The narrower parts are more flexible and enable the carabiners of the net repair patch latching unit to compress more easily during the installation. The wider part of the load-bearing section makes the load-bearing section more rigid and stronger, the wider part has also more contact surface with the net, thus rotates less, is more stable and wears less.

The forepart comprising a locking nudge protruding from an inner side. The size of the locking nudge corresponds to a diameter of 0.2-1 yarn of the net. The locking nudge enables to lock the placement adapter when the placement adapter is pushed between the carabiners. The placement adapter is pushed into the locking position only once the net yarn has slid over the guiding nudge. This extruding locking nudge is adapted to act as a stopper for a locking the placement adapter that pushes the carabiner into wide position and locks it there.

The edge of one or more guiding nudges being elongated outwardly forming between the edge and an outer side of the load-bearing section a channel of the yarn of the repair patch. The embodiment, wherein the edge of one or more guiding nudges being elongated outwardly ensures that when the net yarn has slid over the outwardly elongated edge of the guiding nudge the yarn is unable to slide back, prevents the yarn from coming out from the groove and is thus guided toward the channel where the net is meant to sit.

The edges of the at least one elongated bendable part may be rounded. The edges of the carabiner are rounded in the areas where the carabiner slides into the net. This eases the installation of the net repair patch latching unit.

In these embodiments the channel may comprise a constriction. The constriction is formed by one or more bumps on one or both sides of the channel. The one or more bumps may comprise a first bump on the outwardly elongated edge and one or more second bumps on the opposite side of the channel. The bumps may correspond up to a diameter of 1 yarn of the net. The first bump of the constriction is adapted to prevent the net from slipping back. The one or more bumps are adapted to prevent the net patch from slipping back. The bumps on one or both sides of the channel restrict the yarn movement. Thus, when the yarn is pushed into its place at the installation process and these bumps help to keep the yarn in place.

At least one of the transitional bending area, spine, the forepart and the load-bearing section may comprise reinforcement means. When casting a mould, for example, glass, carbon or other fibers may be added to the material of the carabiners to increase strength, other additives could also be added locally to increase the strength of the material. Alternatively, the reinforcement can also be, for example, a strip made separately and later glued, welded, riveted, or bolted to it. The reinforcement means may be e.g., an additional reinforcement layer made of the same or different material and attached to the part to be reinforced. The reinforcement means provides to the carabiner an extra rigidity. This enables to achieve more even thickness and strength for the carabiner.

The reinforcing spine is added to places where extra rigidity is needed but where the material thickness would result in warping when the carabiner is made by injection moulding.

According to the embodiments, wherein the one or more carabiners comprise two elongated bendable parts or four elongated bendable parts the net repair patch latching unit may further comprise a placement adapter. The placement adapter, when pushed between the elongated bendable parts of the carabiners, enables to keep the carabiners in the maximum wide position. The placement adapter comprises a slot adapted to accommodate the locking nudge when the net repair patch latching unit is in locked position, an angled slope adapted to push the opposing carabiners away from each other, one or more extrusions adapted to keep the placement adapter in right position. The extrusions of the placement adapter help to keep the placement adapter in the right orientation and block any rotation of the net repair patch latching unit. The angled slope of the placement adapter helps to push the carabiner wider. The narrower middle section of the placement adapter is the slot where the locking nudges of the carabiners sits in when it is in a locked position.

According to the embodiments, the net repair patch latching unit is adapted to the yarns of the net with a diameter 1.4-2.8 mm and mesh size 14×14 mm-28×28 mm. Optionally, the elongated bendable parts may comprise one or more protrusions to ease injection moulding and enable easier release of the net repair patch latching unit from the mold.

In an embodiment, a system for a net patching comprising two or more net repair patch latching units according to the embodiments of the present disclosure; a net repair patch, wherein at least one net repair patch latching unit is attached to the net repair patch. The system having two or more, preferably at least three net repair patch latching units enables more secure connection between the net repair patch and the net to be patched, thus ensuring that the repair patch does not come off from the net, especially when e.g., the environmental conditions cause moving or shaking of the net.

In an embodiment, the system further comprises at least one of a net repair patch base frame, a net repair patch mounting tool, one or more drives, power cables, data cables, a camera, one or more sensors. Such embodiment enables to patch the torn net in harsh conditions where additional aid is needed to attach the repair patch to the torn area of the net. E.g., the net repair batch base frame enables the use of bigger repair patches for fixing bigger torn areas in the net. The net repair patch mounting tool enables more stable and precise placement of the repair patch onto the torn area. In some embodiments according to the present disclosure the system may be equipped with the camera to improve finding the torn area in the net and improve the placement of the repair patch onto the torn area in the net. The system may further comprise sensors configured to collect environmental data, operational data of the repair processes and other information. To extend the operating time, the system may comprise power cables to provide power to the camera or one or more sensors. The system may further comprise data cables for transferring the data collected by the camera or one or more sensors. The system may further comprise one or more drives to enable the repair patch mounting tool to move the repair patch to the correct angle in respect of the torn area.

DETAILED DESCRIPTION OF THE DRAWINGS

FIG. 1a illustrates a net repair patch latching unit according to an embodiment of the present disclosure. The net repair patch latching unit 101a comprises a carabiner, wherein the carabiner comprises a load-bearing section 102, a spine 108a, a forepart 108b, a first grooves 112, configured to accommodate a yarn of the net to be repaired, an elongated bendable part 104 having a distal end 124a and a proximal end 124b, a guiding nudge 105 protruding from the load-bearing section 102, an attaching element 116 protruding from the load-bearing section 102. The elongated bendable part comprises a transitional bending area 107 connecting the spine 108a and the proximal end 124b of the bendable part 104. The distal end 124a of elongated bendable part 104 is extended to an L-shaped part 106. The load-bearing section 102 comprises a socket 110 between the load-bearing structure section 102 and the guiding nudge 105.

The distal end 124a is supported against the inner side of the forepart 108b so that between the distal end 124a and the inner side of the forepart 108b is formed a path 114 for the yarn of the net to be patched. On applying the net patch latching unit to the net to be patched, the yarn of the net exerts force to the distal end 124a, the distal end 124a bends from the transitional bending area 107, the L-shaped part 106 moves to the socket 110 and the path 114 between the inner side of the forepart 108b and the distal end 124a opens for letting the yarn of the net to be patched to move to the first groove 112. When the yarn of the net to be patched is moved to the first groove 112 the distal end 124a moves back to its initial position against the inner side of the forepart 108b and locks the path 114 and thus locking the yarn of the net to be patched to the first groove 112 of the carabiner.

Figure 1B:
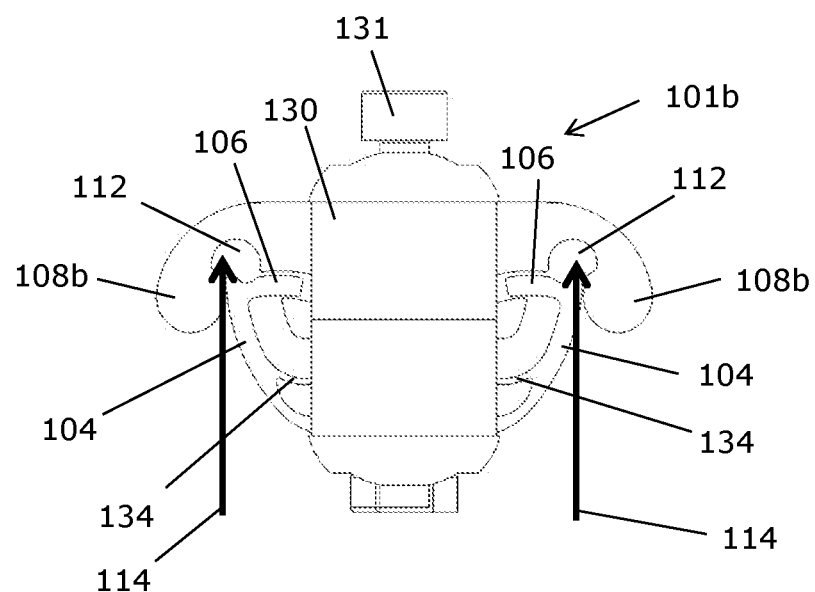

FIG. 1B illustrates a net repair patch latching unit 101b according to an embodiment comprising two carabiners shown on FIG. 1a. The two carabiners are connected to each other by the spines by the net repair patch holding means 130 having a fastening adapter 131, wherein the net repair patch holding means 130 is a bracket. In the embodiment, the carabiner further comprises a reinforcing rib 134 between the elongated bendable part 104 and the spine 108a. The distal ends 124a of both carabiners are supported against the inner sides of the foreparts 108b of both carabiners so that between both distal ends 124a and the inner sides of the foreparts 108b are formed paths 114 for the yarns of the net to be patched. On applying the net patch latching unit to the net to be patched, two yarns of the net exert force to the distal ends 124a, the distal ends 124a bend from the transitional bending areas 107, the L-shaped parts 106 of both carabiners move to the respective sockets and the paths 114 between the inner side of the foreparts 108b and the distal ends 124a open for letting the yarns of the net to be patched to move to the first grooves 112. When the yarns of the net to be patched are moved to the first grooves 112 the distal ends 124a move back to the initial positions against the inner sides of the foreparts 108b and lock the paths 114 and thus locking the yarns of the net to be patched to the first grooves 112 of the carabiner.

Figure 1C:
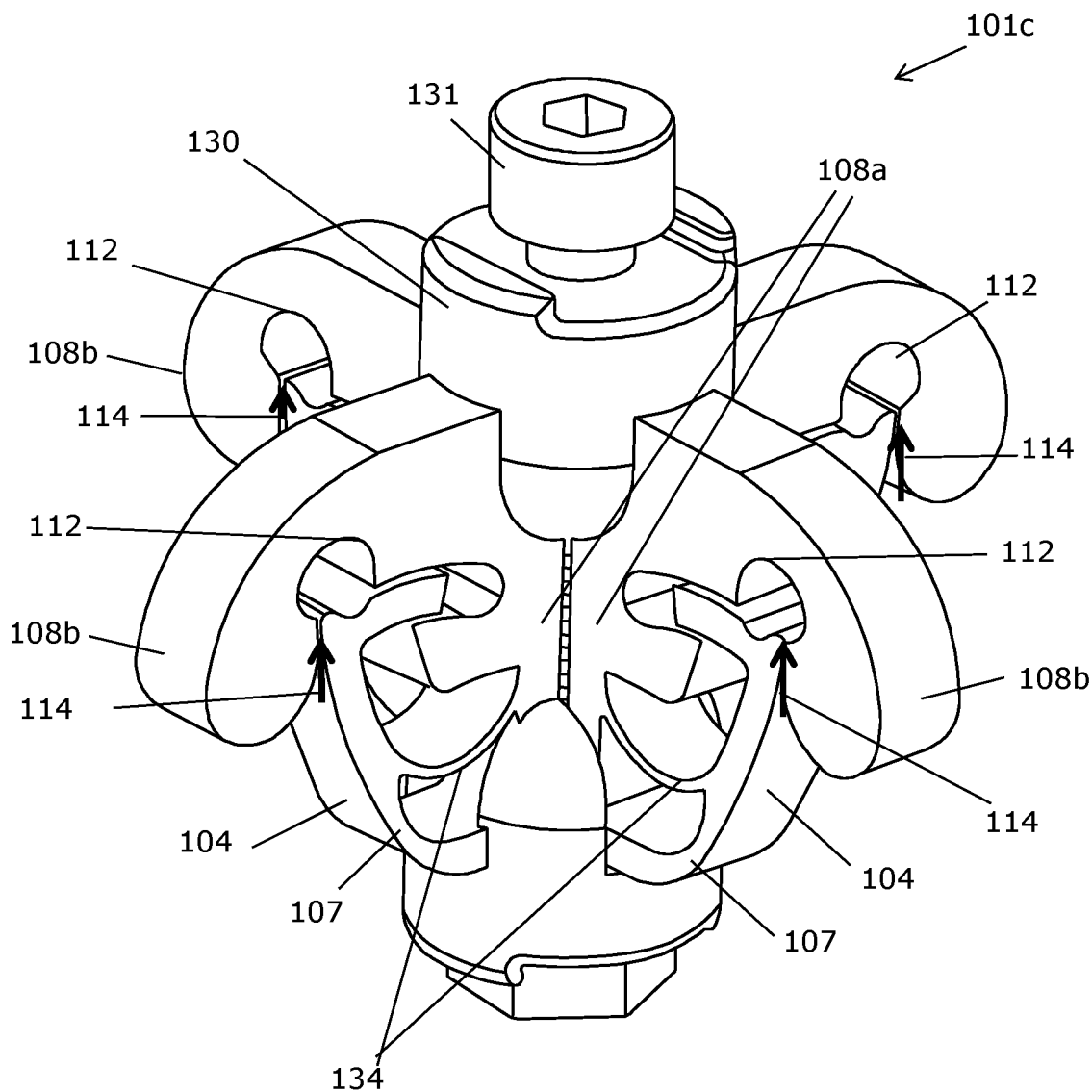

FIG. 1c illustrates a net repair patch latching unit 101c according to an embodiment comprising four carabiners shown on FIG. 1a, wherein the four carabiners are connected to each other by the spines by the net repair patch holding means 130 having a fastening adapter 131. In the embodiment, the carabiner further comprises a reinforcing rib 134 between the elongated bendable part 104 and the spine 108a. The distal ends 124a of each carabiner are supported against the inner sides of each forepart 108b of each carabiner so that between each distal ends 124a and the inner sides of the foreparts 108b are formed paths 114 for the yarns of the net to be patched. On applying the net patch latching unit to the net to be patched, four yarns of the net exert force to the distal ends 124a, the distal ends 124a bend from the transitional bending areas 107, the L-shaped parts 106 of each carabiner move to the respective sockets and the paths 114 between the inner side of the foreparts 108b and the distal ends 124a open for letting the yarns of the net to be patched to move to the first grooves 112. When the yarns of the net to be patched are moved to the first grooves 112 the distal ends 124a move back to the initial positions against the inner sides of the foreparts 108b and lock the paths 114 and thus locking the yarns of the net to be patched to the first grooves 112 of the carabiner.

Figure 2A:
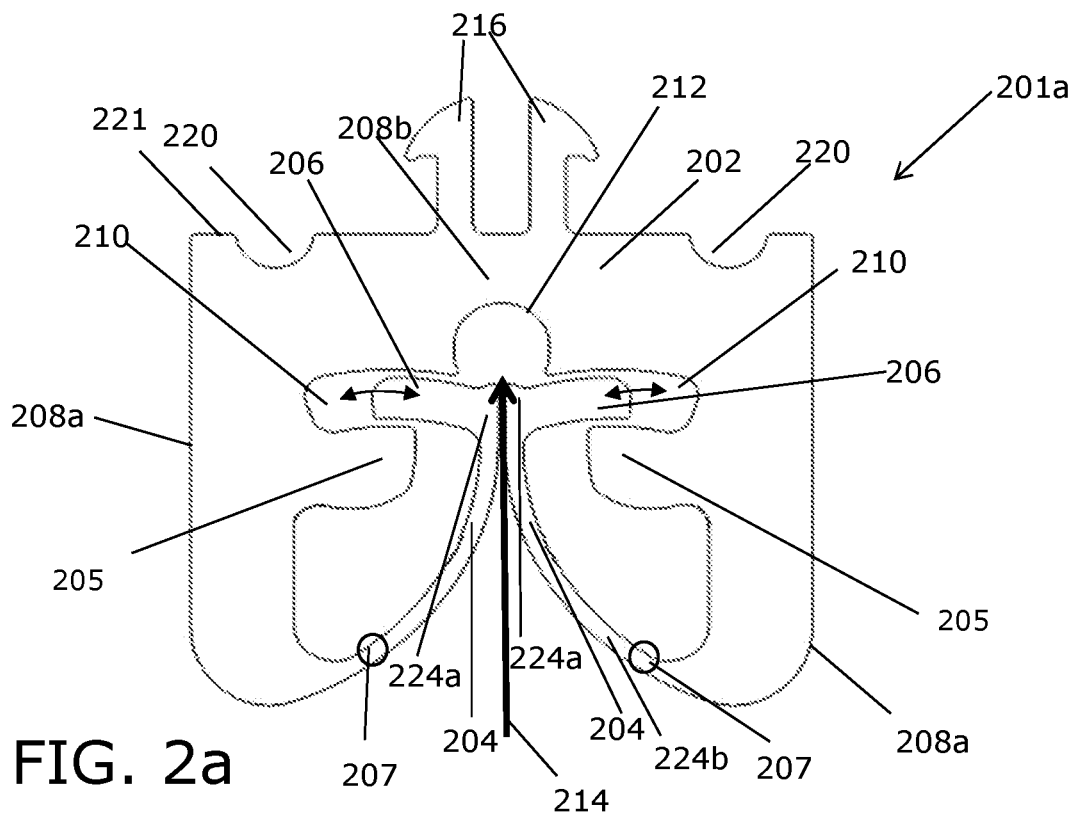
FIG. 2a illustrates a net repair patch latching unit comprising two carabiners according to another embodiment of the present disclosure.

FIG. 2a illustrates a net repair patch latching unit according to another embodiment of the present disclosure comprising two carabiners connected to each other. The net repair patch latching unit comprising two carabiners 201a, wherein the each of the two carabiners comprises a load-bearing section 202, a spine 208a, a forepart 208b, a first groove 212, an elongated bendable part 204 having a distal end 224a and a proximal end 224b, a guiding nudge 205 protruding from the load-bearing section, one or more attaching element 216 protruding from the load-bearing section. The load-bearing sections 202 of both carabiners of the net repair patch latching unit are connected to each other by the foreparts 208b, wherein the first groove 212 located below the connection area of the foreparts 208b of each carabiner is configured to accommodate a yarn of the net to be repaired. The elongated bendable part comprises a transitional bending area 207 connecting the spine 208a and the proximal end 224b the bendable part 204. The distal end 224a of elongated bendable part 204 is extended to an L-shaped part 206. The load-bearing section 202 comprises a socket 210 between the at least one load-bearing structure section 202 and the guiding nudges 205. In such embodiment the distal ends 224a of the elongated bendable parts 204 of both carabiners are arranged to be supported against each other so that a path 214 for the yarn of the net to be patched is formed.

On applying the net patch latching unit to the net to be patched, a yarn of the net exerts force to the distal ends 224a, the distal ends 224a bend from the transitional bending areas 207, the L-shaped parts 206 of both carabiners move to the respective sockets 210 and the path 214 between the two distal ends 224a open for letting the yarn of the net to be patched to move to the first groove 212. When the yarns of the net to be patched is moved to the first groove 212 the distal ends 224a move back to the initial positions against each other and lock the path 214 and thus locking the yarn of the net to be patched to the first groove 212 of the carabiner.

Figure 2B:
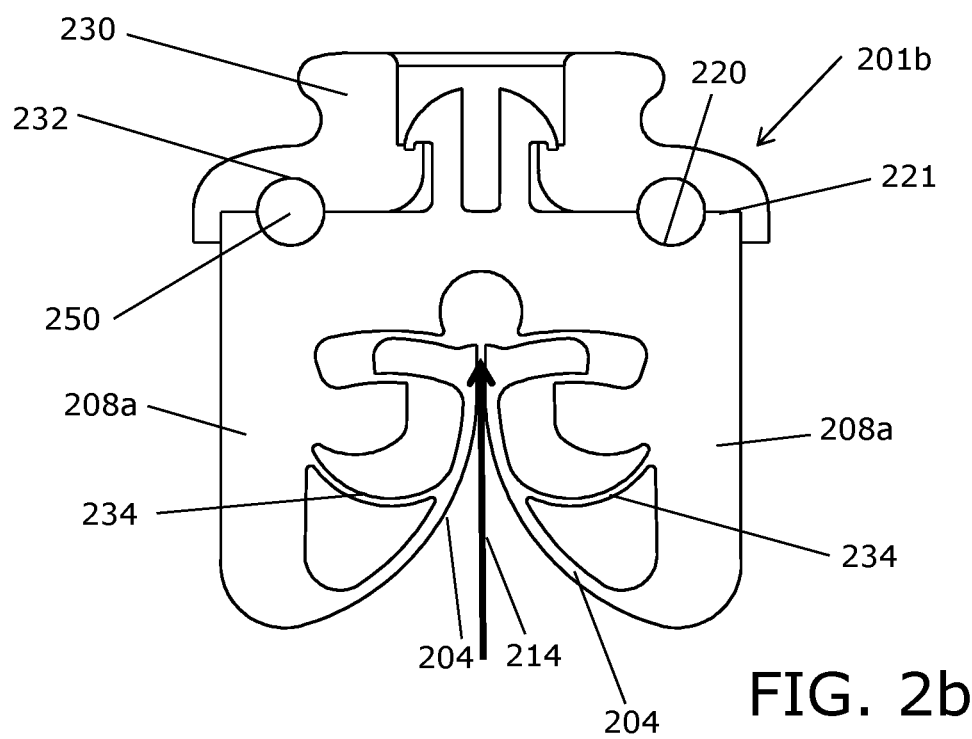

FIG. 2b illustrates an assembled embodiment of the net repair patch latching unit shown on FIG. 2a, wherein the net repair patch latching unit comprises additionally a reinforcing rib 234 between the elongated bendable part 204 and the spine 208a and a clip-on element 230 having two third grooves 232 and wherein the load-bearing section 202 further comprises at the outer edge 221 one or more second grooves 220 and the two third grooves 232 of the clip-on element 230 are configured, when clipped to the carabiner, to form a channel 250 of the yarn of the repair patch.

Figure 2C:
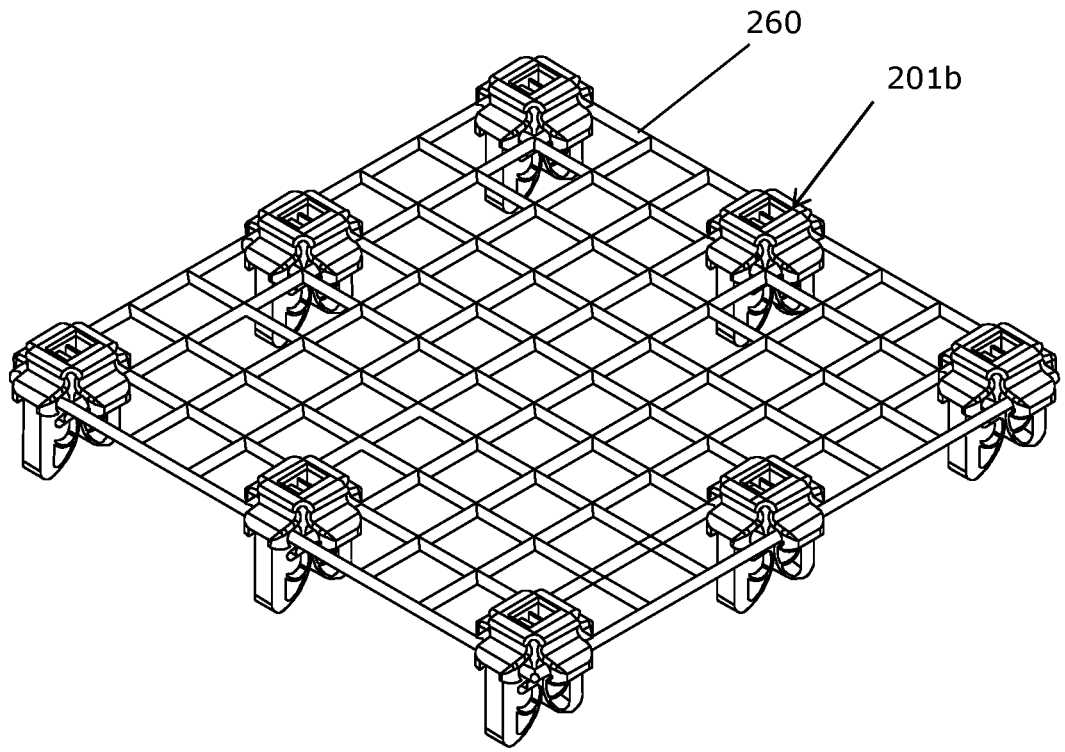
FIG. 2c illustrates the net repair patch latching unit of FIG. 2b attached to a net repair patch

FIG. 2c illustrates an embodiment of the net repair patch latching unit 210b of FIG. 2b, wherein eight net repair patch latching units 210b are attached to a net repair patch 260.

Figure 3A:
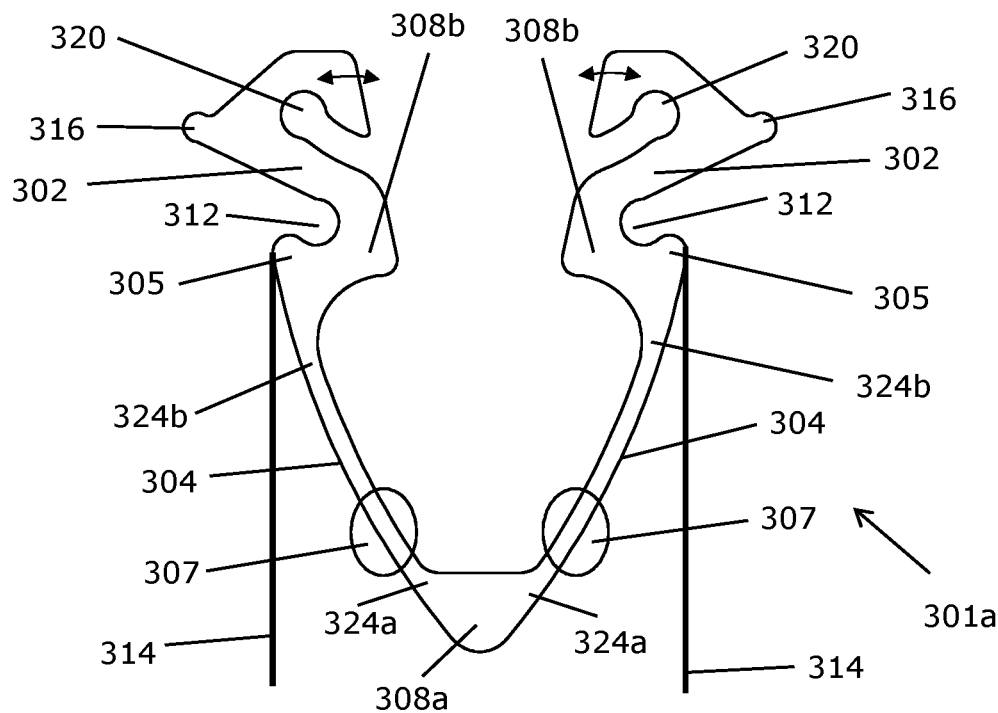
FIG. 3a illustrates an embodiment of a carabiner of net repair patch latching unit comprising two elongated bendable parts.

FIG. 3a illustrates an embodiment of a carabiner of net repair patch latching unit, wherein the carabiner of net repair patch latching unit comprises two carabiners 301a, wherein the two carabiners both comprise a load-bearing section 302, a spine 308a and a forepart 308b, a first groove 312 configured to accommodate a yarn of the net to be repaired, an elongated bendable part 304 having a distal end 324a and a proximal end 324b, a guiding nudge 305 protruding from the load-bearing section, an attaching element 316 protruding from the load-bearing section. The elongated bendable part comprises a transitional bending area 307 connecting the spine 308a and the proximal end 324b of the bendable part 304. The distal ends 324a of the two elongated bendable parts 304 are connected by the spine 308a. The distal end 324a of elongated bendable part 304 is formed to a S-shaped profile in side-view having a first curvature forming the first groove 312 and a second curvature forming a second groove 320 and the load-bearing section is formed between the first groove 312 and the second groove 320. On applying the net patch latching unit to the net to be patched, the spine 308a is pushed through the net to be patched and the yarns of the net to be patched are pushed to the first grooves 312, wherein the guiding nudge 305 are arranged to block the path 314 so that the yarns don't slip out from the grooves 312.

Figure 3B:
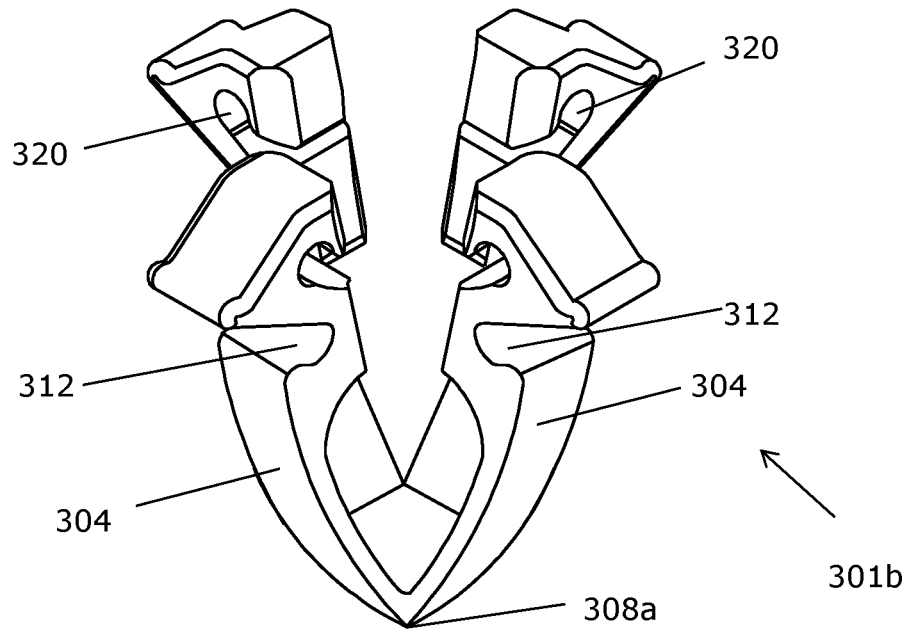
FIG. 3b illustrates an embodiment of a carabiner of net repair patch latching unit comprising four elongated bendable parts.

FIG. 3b illustrates an embodiment of a carabiner of net repair patch latching unit, wherein the carabiner 301b comprises four elongated bendable parts 304 and the distal ends 324a of the four elongated bendable parts 304 are connected by the spine 308a.

Figure 3C:
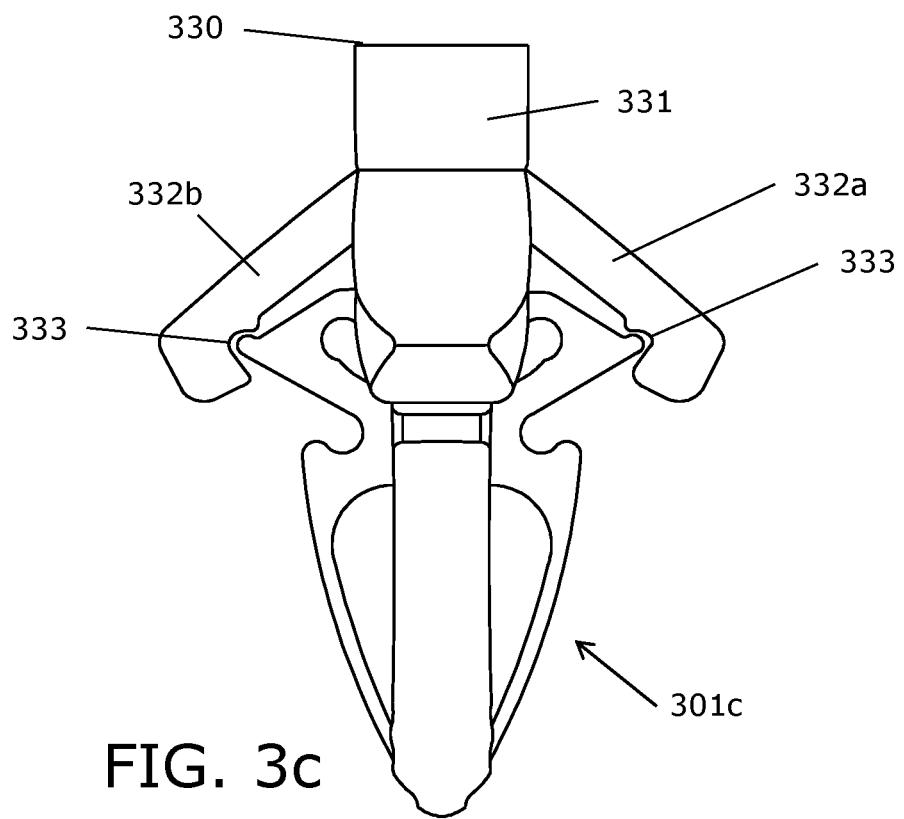
FIG. 3c illustrates an assembled embodiment of the net repair patch latching unit comprising the carabiner shown on FIG. 3b.

FIG. 3c illustrates an assembled embodiment of the net repair patch latching unit comprising the carabiner shown on FIG. 3b, wherein the net repair patch latching unit further comprises the repair patch holding means, which is formed of a clamp 330 having a body 331 and two pairs of legs 332a, 332b extended from the body 331, wherein each bendable leg comprises at it extending end a socket 333 of the one or more guiding nudges.

Figure 3D:
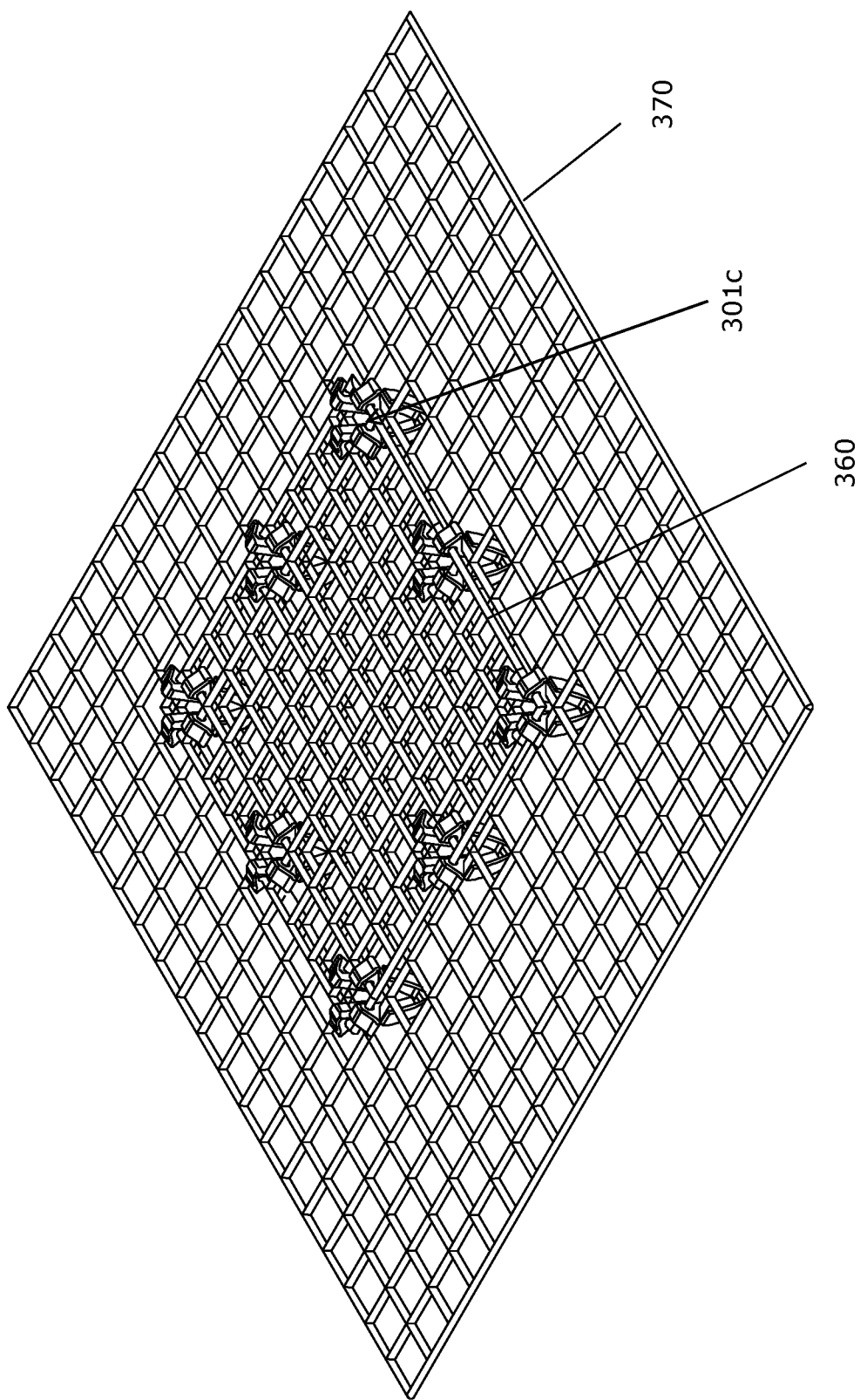
FIG. 3d illustrates the net repair patch latching unit applied onto a net.

FIG. 3d illustrates an embodiment of the net repair patch latching unit 301c of FIG. 3c, wherein eight net repair patch latching units 301c are attached to a net repair patch 360. The net repair patch 360 together with the eight net repair patch latching units 301c is applied onto the net to be patched 370.

Figure 4:
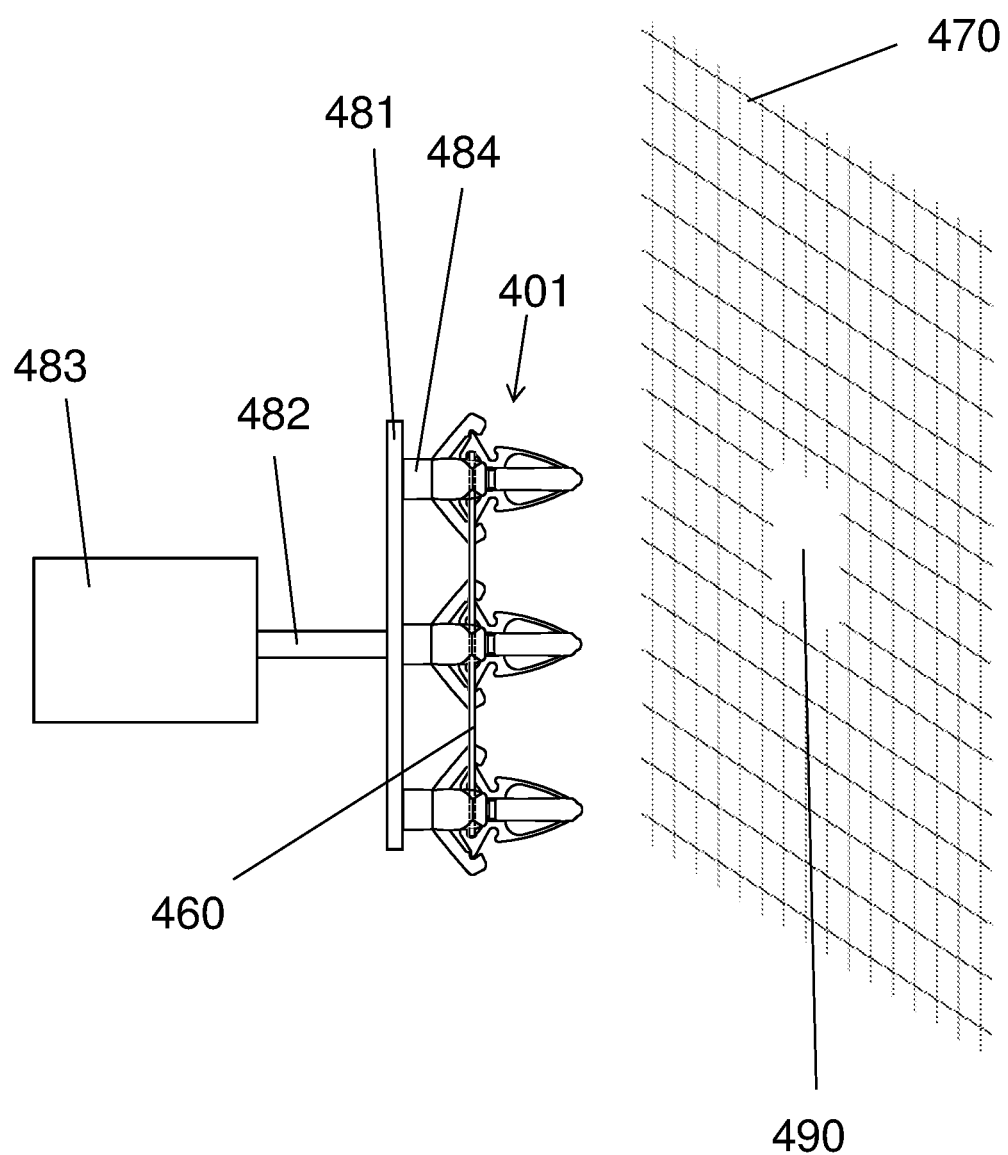
FIG. 4 illustrates an embodiment of a system for a net patching according to the present disclosure.

FIG. 4 illustrates an embodiment of a system for a net patching according to the present disclosure. The system for a net patching comprises eight net repair patch latching units 401, a net repair patch 460, wherein each net repair patch latching unit 401 comprises a clamp 484 and the eight net repair patch latching unit 401 are attached to the net repair patch 460 by the clamps 484. The system further comprises, a net repair patch mounting tool 482 having a base frame 481 for net repair patch 460 and a robot 483, wherein net repair patch mounting tool 482 is attached to the robot 483 for holding the base frame 481 arranged for the net repair patch 460 with the net repair patch latching units 401. The robot 483 is configured to carry the net repair patch 460 with the net repair patch latching units 401 on the base frame 481 to a torn net 470 to be patched, to push the base frame 481 together with the net repair patch 460 with the net repair patch latching units 401 on to the area of the net to be patched. When the net repair patch 460 with the net repair patch latching units 401 is attached on to the torn area 490 of the net, the net repair patch latching units 401 are released from the clamps 484.

Figure 5A:
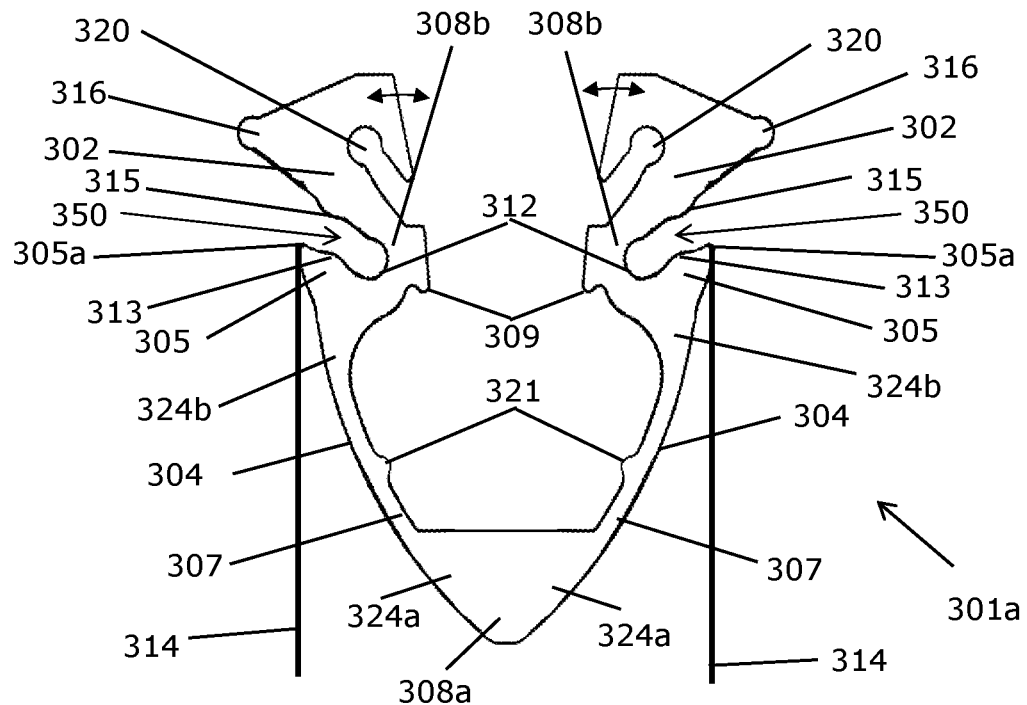
FIG. 5a illustrates an alternative solution of a carabiner of the net repair patch latching unit shown in FIG. 3a in side view.
Figure 5B:
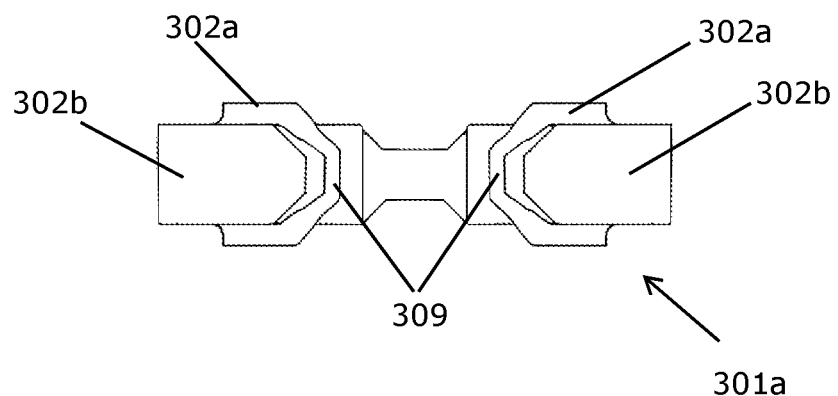
FIG. 5b shows the carabiner of net repair patch unit shown in FIG. 5a in top view.

FIG. 5a illustrates an alternative solution of carabiners of the net repair patch latching unit shown in FIG. 3a in side view and FIG. 5b shows the carabiner of net repair patch unit shown in FIG. 5a of the alternative solution in top view. In the alternative solution an edge 305a of one or more guiding nudges 305 is elongated outwardly forming between the edge 305a and an outer side of the load-bearing section 302 a channel 350 of the yarn of the repair patch. The channel 350 further comprises a constriction, which formed of a first bump 313 on the outwardly elongated edge 305a of the guiding nudge 305 and a two second bumps 315 on the opposite side of the channel. The forepart 308b of the carabiner further comprises a locking nudge 309. Each of the elongated bendable parts 304 comprises a protrusion.

In the alternative solution the load-bearing section 302 additionally comprises a first part 302a accommodating the first groove 316 and a second part 302b accommodating the attaching element 316 and the second groove 320, wherein the first part 302a is wider than the second part 302b.

Figure 6:
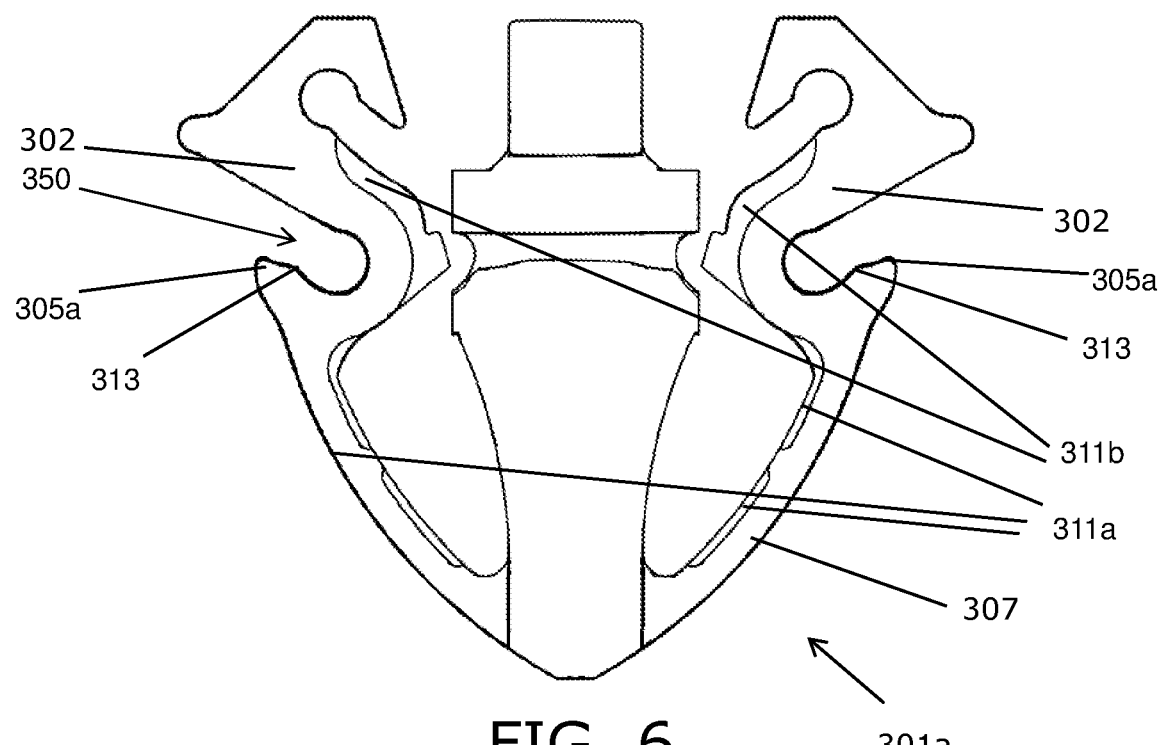
FIG. 6 illustrates an alternative solution of a carabiner of the net repair patch latching unit shown in FIG. 3b in side view.

FIG. 6 illustrates an alternative solution of a carabiner of the net repair patch latching unit shown in FIG. 3b in side view. In this alternative solution the constriction of the channel 350 is formed of a first bump 313 on the outwardly elongated edge 305a of the guiding nudge 305. The alternative solution further comprises transitional bending areas 307 having a first reinforcement means 311a and the load-bearing section 302 having a second reinforcement means 311b.

Figure 7:
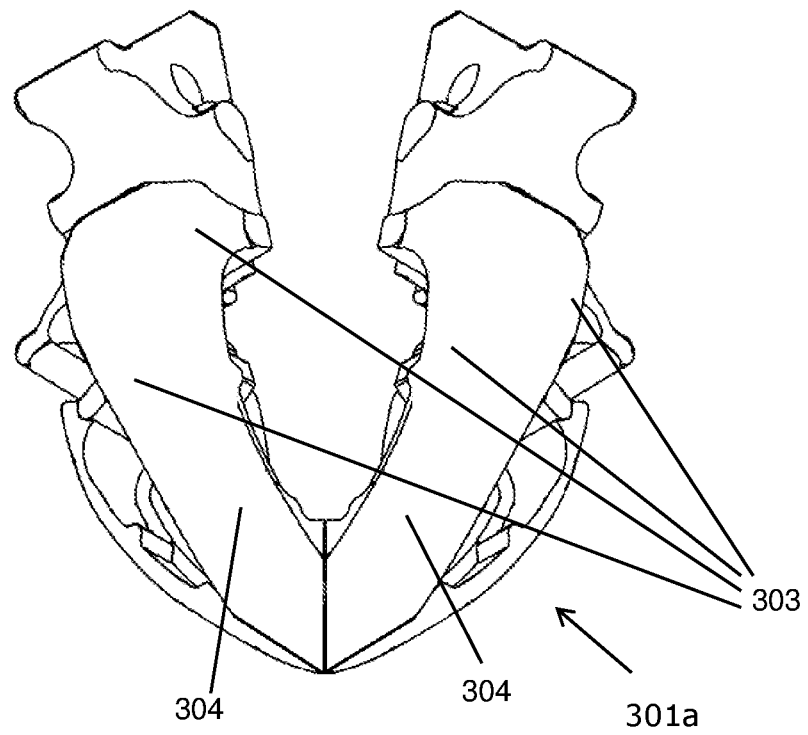
FIG. 7 shows the carabiner of net repair patch unit shown in FIG. 6 in perspective view.

FIG. 7 shows the carabiners of net repair patch unit shown in FIG. 6 in perspective view, wherein the edges of the at least one elongated bendable part 304 are rounded 303.

FIG. 8a-FIG. 8d shows the net repair patch latching unit shown in FIG. 6 in top and side views illustrating an embodiment, wherein the net repair patch latching unit comprises a placement adapter 380. In top views FIG. 8a and FIG. 8c and in side views FIG. 8b and FIG. d different positions of the placement adapter 380 are shown. In figures FIG. 8a and FIG. 8b the placement adapter 380 is pushed between the elongated bendable parts 304 of the carabiners.

Figures 8A, 8C:
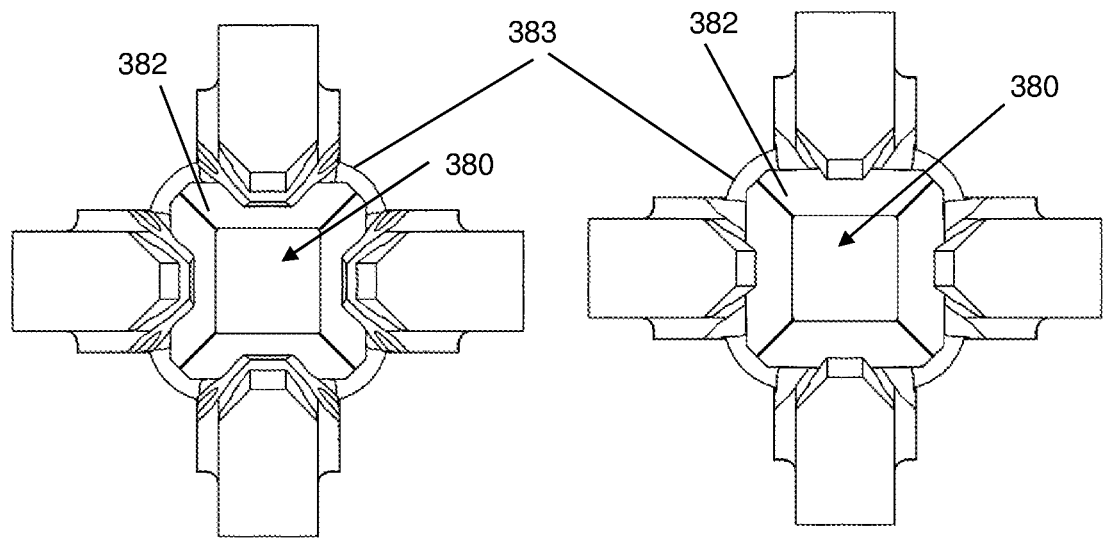
FIG. 8a-FIG. 8d illustrate a placement adapter of the net repair patch latching unit shown in FIG. 6 in top and side views.
Figures 8B, 8D:
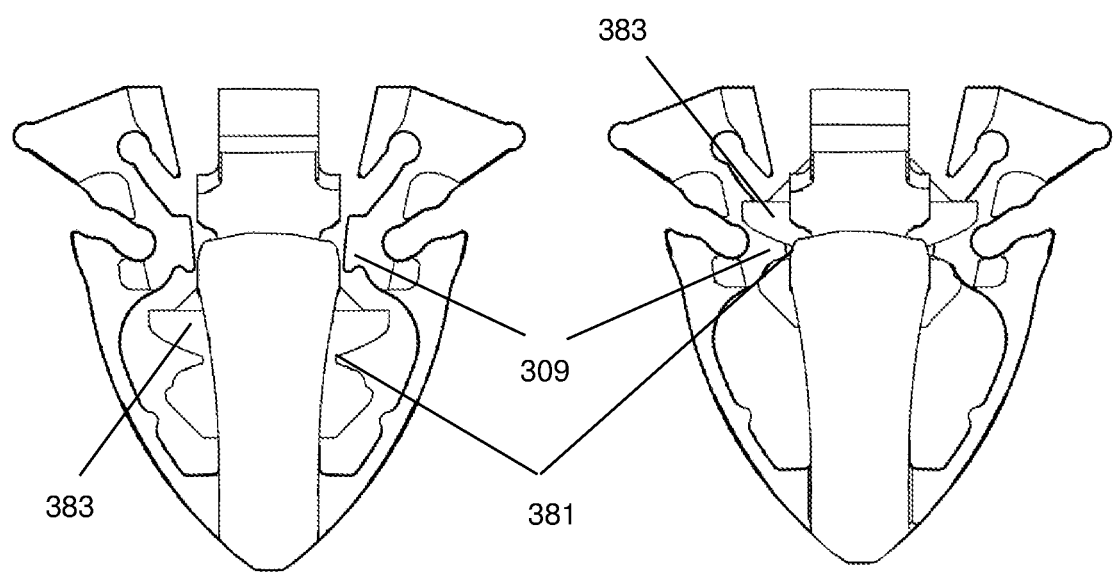

The placement adapter 380 shown in figures FIG. 8a-FIG. 8b comprises a slot 381 adapted to accommodate the locking nudge 309 when the net repair patch latching unit is in locked position, an angled slope 382 adapted to push the opposing carabiners away from each other, one or more extrusions 383 adapted to keep the placement adapter in right position.

Figure 9:
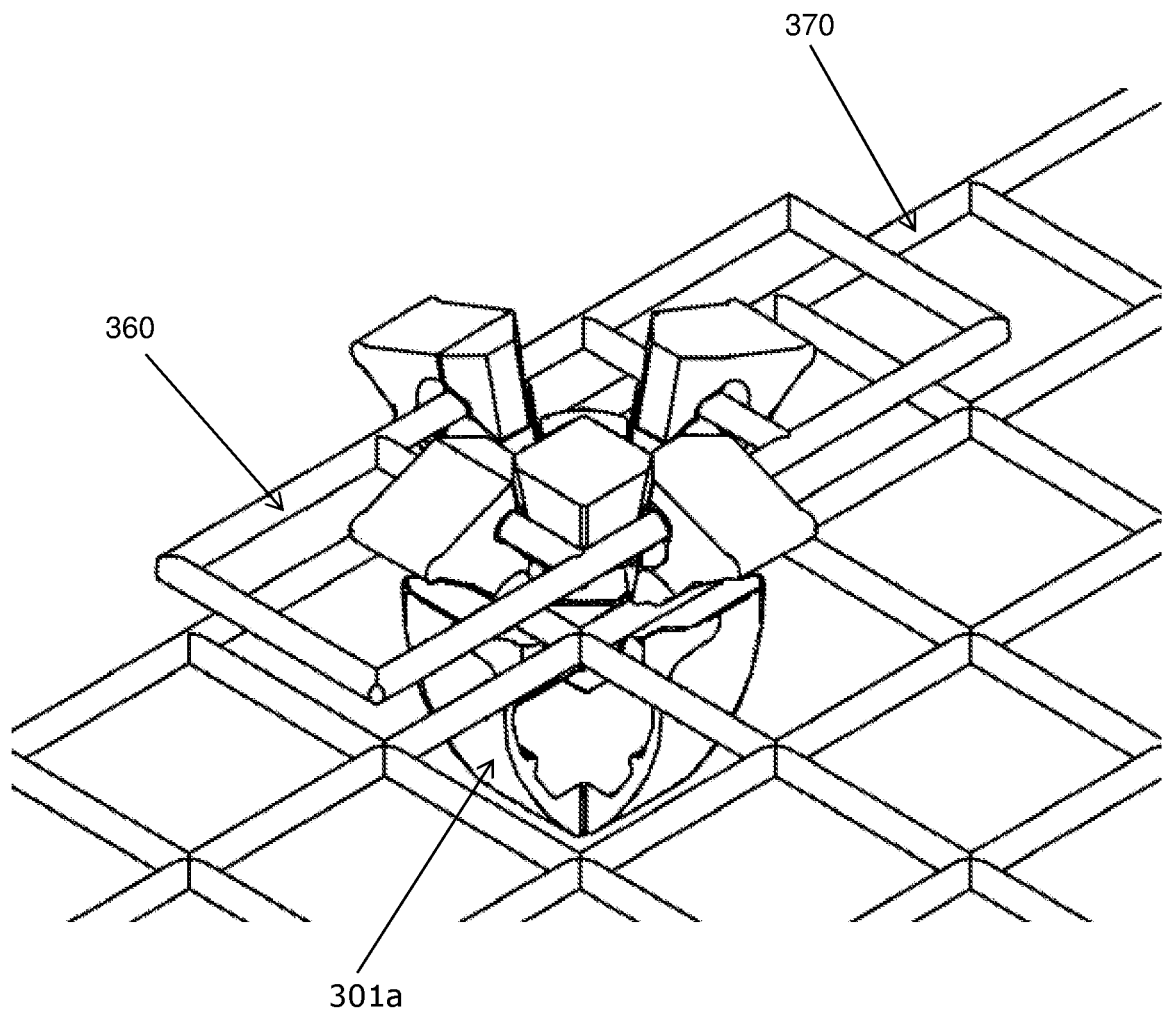
FIG. 9 illustrates the net repair patch latching unit shown in FIG. 6 comprising a repair patch and installed to a net to be repaired.

FIG. 9 illustrates the net repair patch latching unit 301a shown in FIG. 6 comprising a repair patch 360 and installed to a net to be repaired 370.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A net repair patch latching unit comprising one or more carabiners, wherein the one or more carabiners comprises
   at least one load-bearing section;
   a spine and a forepart;
   one or more first grooves configured to accommodate a yarn of the net to be repaired;
   at least one elongated bendable part having a distal end and a proximal end, wherein the at least one elongated bendable part comprises at least one transitional bending area connecting the spine and the proximal end of the at least one bendable part;
   one or more guiding nudges protruding from the load-bearing section; and
   one or more attaching element protruding from the load-bearing section,
   wherein the load-bearing section further comprises at the outer edge one or more second grooves.

2. The net repair patch latching unit according to claim 1, wherein the net repair patch latching unit comprises two carabiners connected to each other by the spines by a net repair patch holding means or wherein the net repair patch latching unit comprises four carabiners connected to each other by the spines by the net repair patch holding means; wherein the distal end of elongated bendable part is extended to an L-shaped part, and wherein the load-bearing section comprises a socket between the at least one load-bearing section and the one or more guiding nudges.

3. The net repair patch latching unit according to claim 1, wherein the net repair patch latching unit comprises two load-bearing sections connected to each other by the foreparts; wherein the distal end of elongated bendable part is extended to an L-shaped part, and wherein the load-bearing section comprises a socket between the at least one load-bearing section and the one or more guiding nudges.

4. The net repair patch latching unit according to claim 1, wherein the one or more carabiners comprises two elongated bendable parts, wherein the distal ends of the two elongated bendable parts are connected by the spine; or wherein the one or more carabiners comprises four elongated bendable parts, wherein the distal ends of the four elongated bendable parts are connected by the spine.

5. The net repair patch latching unit according to claim 1, wherein the distal end of elongated bendable part is formed to a S-shaped profile in side-view having a first curvature forming the first groove and a second curvature forming a second groove and wherein the load-bearing section is formed between the first groove and the second groove.

6. The net repair patch latching unit according to claim 1, wherein the net repair patch holding means is a bracket.

7. The net repair patch latching unit according to claim 1, wherein the repair patch latching unit comprises a clip-on element having one or more third grooves configured when clipped to the one or more carabiners to form a channel of the yarn of the repair patch.

8. The net repair patch latching unit according to claim 1, wherein the repair patch holding means is formed of a clamp having a body and at least one pair of legs extended from the body, wherein each leg comprises at an extending end a socket of the one or more guiding nudges.

9. The net repair patch latching unit according to claim 1, wherein the one or more first grooves and second grooves are coated with a grip coating selected from a group comprising high grip paint, a thin layer of rubber, a rubbery plastic.

10. The net repair patch latching unit according to claim 1, wherein the net repair patch latching unit comprises a net repair patch.

11. The net repair patch latching unit according to claim 1, wherein the one or more carabiners further comprises at least one of:
    the load-bearing section comprises a first part comprising at least one of the one or more first grooves and a second part comprising the attaching element and at least one or more of the second grooves, wherein the first part is wider than the second part;
    the forepart comprises a locking nudge;
    an edge of one or more guiding nudges is elongated outwardly forming between the edge and an outer side of the load-bearing section a channel of the yarn of the repair patch;
    edges of the at least one elongated bendable part are rounded.

12. The net repair patch latching unit according to claim 11, wherein the channel comprises a constriction.

13. The net repair patch latching unit according to claim 11, wherein the net repair patch latching unit comprises a placement adapter.

14. The net repair patch latching unit according to claim 1 wherein the at least one of the transitional bending area, the spine, the forepart and the load-bearing section comprises reinforcement means.

15. A system for a net patching comprising two or more net repair patch latching units according to claim 1; a net repair patch, wherein at least one net repair patch latching unit is attached to the net repair patch.

16. The system according to claim 15, wherein the system further comprises at least one of a net repair patch base frame, a net repair patch mounting tool having at least one base frame of the net repair patch, one or more drives, power cables, data cables, a camera, one or more sensors.

\* \* \* \* \*